United States Patent [19]

Yanagi

[11] Patent Number: 5,182,736
[45] Date of Patent: Jan. 26, 1993

[54] DECELERATION CONTROL SYSTEM FOR POSITIONING AN OPTICAL HEAD IN AN OPTICAL DISK UNIT

[75] Inventor: Shigenori Yanagi, Kawasaki, Japan

[73] Assignee: Fujitsu Limited, Kanagawa, Japan

[21] Appl. No.: 593,904

[22] Filed: Oct. 3, 1990

[30] Foreign Application Priority Data

Oct. 12, 1989 [JP] Japan .................................. 1-265587
Oct. 12, 1989 [JP] Japan .................................. 1-265589

[51] Int. Cl.$^5$ ............................................ G11B 7/085
[52] U.S. Cl. .................................. 369/32; 369/44.28; 369/44.11; 369/58; 369/41; 360/78.06; 360/73.03; 360/77.02
[58] Field of Search .................. 369/44.28, 32, 54, 51, 369/58, 41, 44.11, 44.27, 44.29; 360/78.06, 77.02, 73.03

[56] References Cited

U.S. PATENT DOCUMENTS

| | | | |
|---|---|---|---|
| 4,835,752 | 5/1989 | Nakatsu et al. | 369/32 |
| 4,932,013 | 6/1990 | Kojima et al. | 369/44.28 |
| 5,033,037 | 7/1991 | Yanagi | 369/44.28 |
| 5,050,146 | 9/1991 | Richgels et al. | 369/44.28 |
| 5,065,383 | 11/1991 | Tateishi et al. | 369/44.28 |

FOREIGN PATENT DOCUMENTS

| | | |
|---|---|---|
| 0289143 | 11/1988 | European Pat. Off. . |
| 0304299A2 | 11/1988 | European Pat. Off. . |
| 0304299A3 | 2/1989 | European Pat. Off. . |
| 177640 | 8/1986 | Japan . |
| 177641 | 8/1986 | Japan . |
| 104274 | 5/1988 | Japan . |
| 127437 | 5/1988 | Japan . |
| 276714 | 11/1988 | Japan . |
| 205733 | 8/1989 | Japan . |

Primary Examiner—Tommy P. Chin
Assistant Examiner—Khoi Truong
Attorney, Agent, or Firm—Armstrong, Westerman, Hattori, McLeland & Naughton

[57] ABSTRACT

A deceleration control system is applied to an optical disk unit which includes an optical head for recording information on and/or reproducing information from tracks of an optical disk which rotates at a constant velocity by use of a light beam emitted from the optical head, a track actuator for moving the light beam in a direction traversing the tracks of the optical disk, and a tracking error signal generation circuit for deriving a tracking error signal TES from a signal which is output from the optical head and is dependent on a light beam received from the optical disk. The deceleration control system includes a velocity control part and a deceleration part. The velocity control part includes a first circuit for generating a target velocity $V_t$, a second circuit for detecting a beam moving velocity V based on the tracking error signal TES derived by the tracking error signal generation circuit, and a third circuit for detecting a velocity error $V_e$ of the beam moving velocity V with respect to the target velocity $V_t$ and for controlling the track actuator so as to minimize the velocity error $V_e$. The deceleration part decelerates the track actuator, and includes a circuit for deriving a deceleration time T based on the beam moving velocity V at a track which precedes the target track and supplying a deceleration pulse to the track actuator for the deceleration time T starting from a time when the light beam is a predetermined distance from the target track.

20 Claims, 17 Drawing Sheets

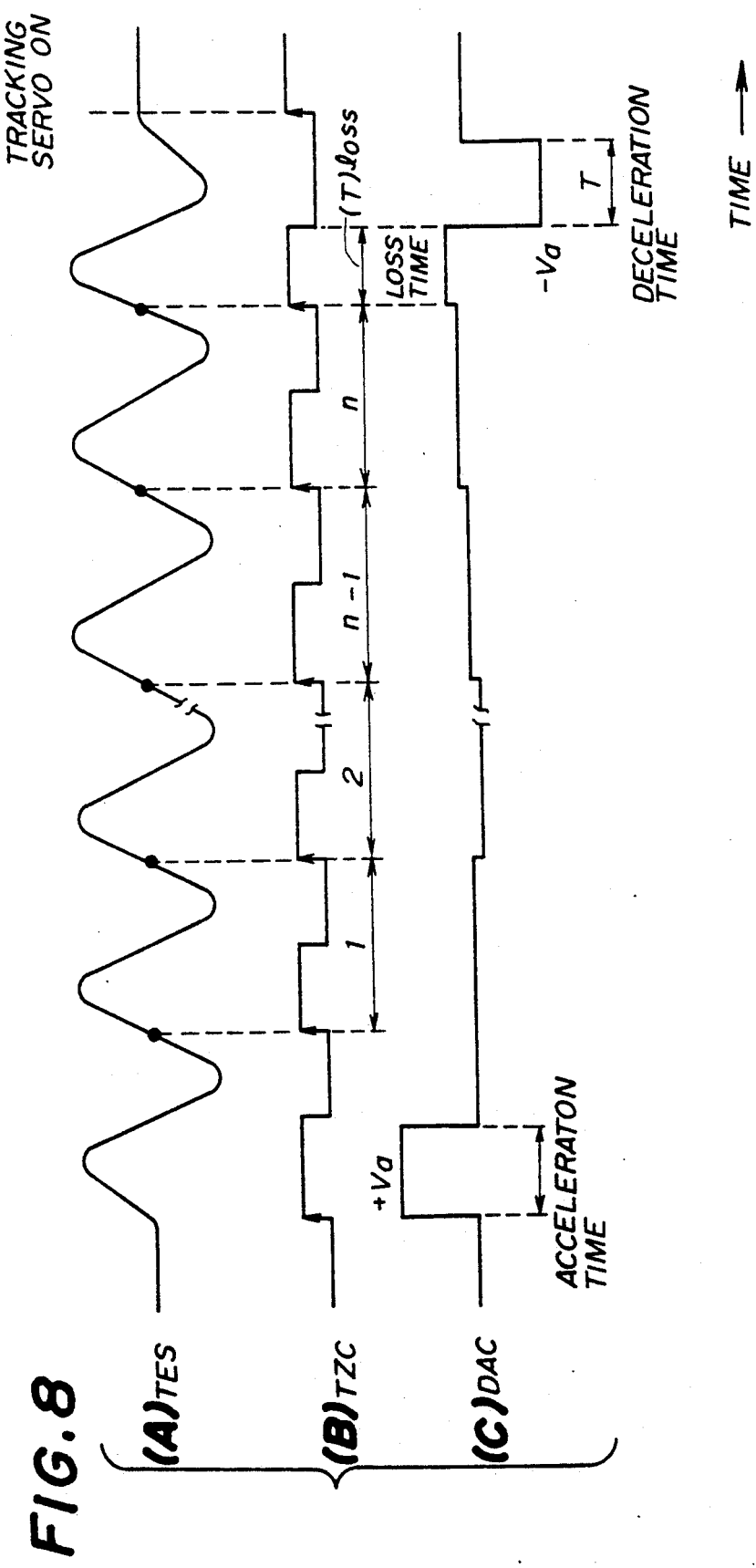

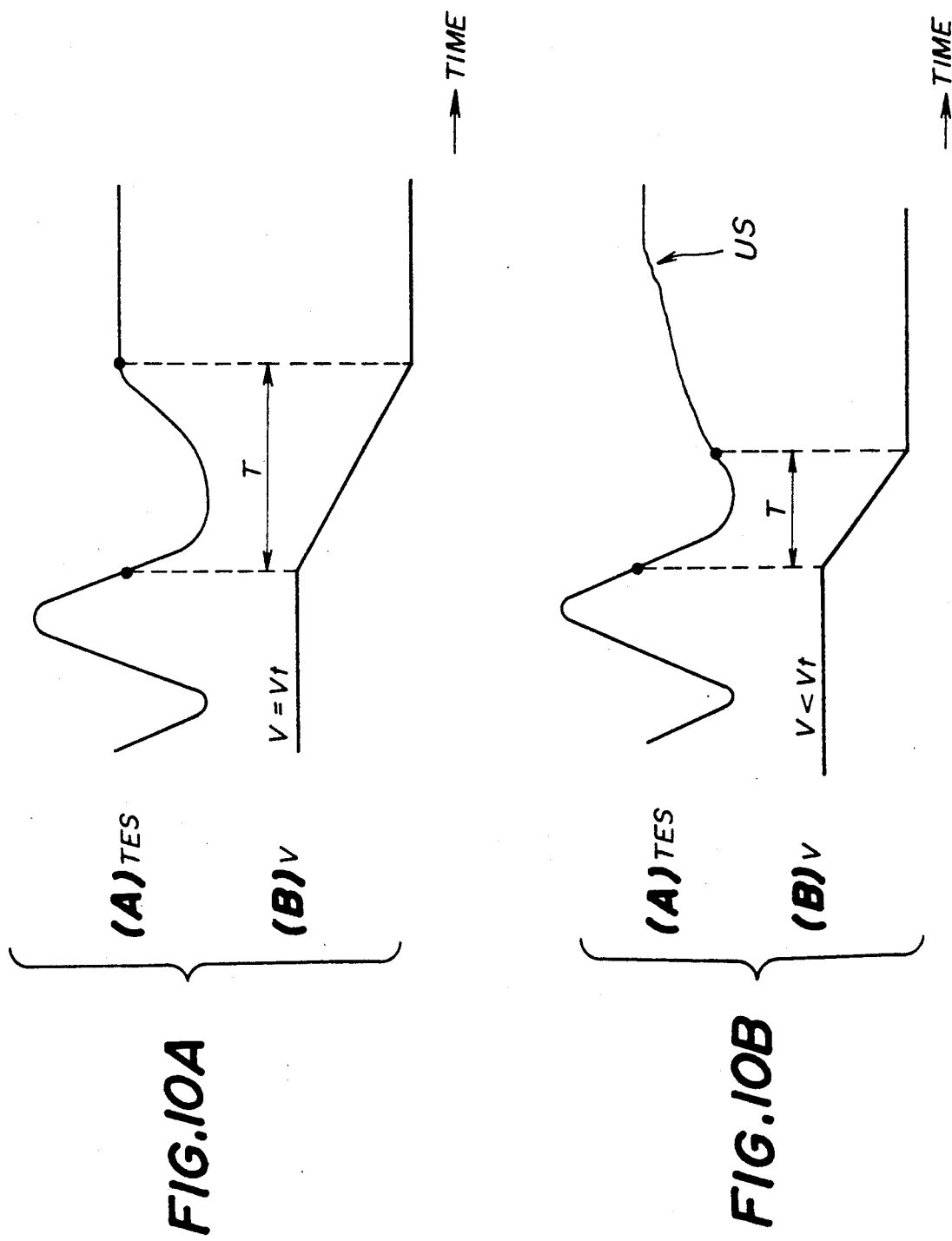

DECELERATION CONTROL SYSTEM FOR POSITIONING AN OPTICAL HEAD IN AN OPTICAL DISK UNIT

BACKGROUND OF THE INVENTION

The present invention generally relates to deceleration control systems, and more particularly to a deceleration control system for an optical disk unit which moves a light beam from an optical head to a target track on an optical disk by controlling a velocity of a track actuator.

An optical disk unit has a large memory capacity because a track pitch of an optical disk can be set in the order of several microns. For this reason, the optical disk unit is suited for use in a computer system or the like as a memory device having a large memory capacity.

A track jump control of the optical disk unit is carried out in response to an external instruction which instructs a read access or a write access. When carrying out the track jump control, the velocity of a track actuator is controlled to move a light beam from an optical head to a specified target track on the optical disk. In other words, the velocity of the track actuator is controlled in a state where a tracking servo is OFF based on a velocity error between a target velocity and a beam moving velocity which is detected from a tracking error signal. In addition, an acceleration of the track actuator is controlled by applying an acceleration pulse voltage to the track actuator when starting the track jump, and a deceleration of the track actuator is controlled by applying a deceleration pulse voltage to the track actuator when ending the track jump.

However, the beam moving velocity before the deceleration control which is carried out immediately before the end of the track jump does not necessarily match the target velocity exactly. Normally, there is an error in the velocity control and the beam velocity does not become exactly zero even when the deceleration control is carried out for a predetermined time. For this reason, the beam position becomes unstable after the tracking servo becomes ON at the end of the track jump. Accordingly, it is desirable to realize a deceleration control system which decelerates the track actuator so that there is no velocity error when the tracking zero becomes ON at the end of the track jump.

FIG. 1 shows an essential part of an example of a conventional optical disk unit. An optical disk 10 is rotated at 3600 rpm, for example, by a spindle motor 24. An optical head 12 is arranged movable with respect to the optical disk 10, and a head driving motor 26 moves the optical head 12 in a radial direction of the optical disk 10. The optical head 12 emits a light beam which illuminates the optical disk 10 for reading information from and/or writing information on the optical disk 10.

A semiconductor laser 28 is provided as a light source within the optical head 12. A light beam emitted from the semiconductor laser 28 is directed to an objective lens 36 via a collimator lens 30, a deflection beam splitter 32 and a λ/4 plate 34, and the objective lens 36 converges the light beam into a beam spot on the optical disk 10. A reflected beam from the optical disk 10 is reflected in a perpendicular direction by the deflection beam splitter 32 and is supplied to a 4-segment photodetector 40 via a condenser lens 38.

In the optical disk unit described above, a plurality of tracks are formed on the optical disk 10 with a track pitch of 1.6 μm, for example, along the radial direction of the optical disk 10. For this reason, the track position deviates greatly even by a slight eccentricity of the optical disk 10. In addition, the focal position of the beam spot deviates by an undulation of the optical disk 10. Therefore, the beam spot having a diameter of 1 μm or less must follow such deviations in the track position and the focal position.

Hence, a focus actuator 42 is provided for adjusting the focal position by moving the objective lens 36 of the optical head 12 up and down in FIG. 1. In addition, a track actuator 44 is provided for controlling the tracking of the beam by moving the objective lens 36 in a direction which traverses the tracks on the optical disk 10.

The focus actuator 42 is controlled by a focus servo circuit 46. In other words, the focus servo circuit 46 drives the focus actuator 42 so that a focus error signal FES which is derived from an output light detection signal of the 4-segment photodetector 40 becomes a minimum.

The track actuator 44 is controlled by a tracking servo circuit 48 during a tracking servo operation in which the light beam is controlled to follow the target track. On the other hand, the track actuator 44 is controlled by a velocity control circuit 50 during a track jump operation in which the light beam jumps to an arbitrary track for making a new access.

FIGS. 2A and 2B are diagrams for explaining the conventional track jump control. FIG. 2A shows a case where the light beam jumps from an initial position S to a target track position TP. A velocity servo operation using a feedback loop is carried out to control the track actuator 44 so as to minimize a velocity error $V_e$ between a target velocity $V_t$ and a beam moving velocity V. At the same time, an acceleration pulse having an acceleration voltage $+V_a$ shown in FIG. 2B(A) is applied to the track actuator 44 for a predetermined time at the start of the track jump so that the light beam quickly reaches the target velocity $V_t$. In addition, a deceleration pulse having a deceleration voltage $-V_a$ shown in FIG. 2B(B) is applied to the track actuator 44 for a predetermined time at the end of the track jump, so that the target track position TP is reached when the beam moving velocity V becomes zero and the tracking servo operation starts in this state. FIG. 2B(C) shows an actual beam moving velocity $V_L$.

However, according to the conventional track jump control, the beam moving velocity V does not become exactly zero even when the deceleration control with respect to the track actuator 44 ends, and there is a problem in that the beam position becomes unstable after the tracking servo operation starts.

FIG. 3A shows a case where the beam moving velocity V at a time t1 when the deceleration starts is equal to the target velocity $V_t$ and no velocity error $V_e$ exists between the target velocity $V_t$ and the beam moving velocity V. In this case, the beam moving velocity V becomes exactly zero by the deceleration control which is carried out for a constant deceleration time T which is identical to the acceleration time. For this reason, the beam position is stable after the tracking servo operation starts.

On the other hand, FIG. 3B shows a case where the beam moving velocity V at the time t1 when the deceleration starts is greater than the target velocity $V_t$ and a velocity error $+V_e$ exists between the target velocity $V_t$ and the beam moving velocity V. Similarly, FIG. 3C shows a case where the beam moving velocity V at the time t1 when the deceleration starts is smaller than the target velocity $V_t$ and a velocity error $-V_e$ exists between the target velocity $V_t$ and the beam moving velocity V. In the cases shown in FIGS. 3B and 3C, the beam moving velocity V does not become exactly zero even when the deceleration control is carried out for the constant deceleration time T. As a result, the beam position becomes unstable after the tracking servo operation starts, and there is a problem in that a relatively long waiting time is required until the light beam reaches the correct read/write position.

SUMMARY OF THE INVENTION

Accordingly, it is a general object of the present invention to provide a novel and useful deceleration control system in which the problems described above are eliminated.

Another and more specific object of the present invention is to provide a deceleration control system for an optical disk unit which includes an optical head for recording information on and/or reproducing information from tracks of an optical disk by use of a light beam emitted from the optical head, a track actuator for moving the light beam in a direction traversing the tracks of the optical disk, and a tracking error signal generation circuit for deriving a tracking error signal TES from a signal which is output from the optical head and is dependent on a light beam received from the optical disk, where the tracking error signal TES is generated every time the light beam traverses a track and the deceleration control system comprises velocity control means coupled to the optical head and including first means for generating a target velocity $V_t$, second means for detecting a beam moving velocity V based on the tracking error signal TES derived by the tracking error detection circuit, and third means for detecting a velocity error $V_e$ of the beam moving velocity V with respect to the target velocity $V_t$ and for controlling the track actuator so as to minimize the velocity error $V_e$, and deceleration means for decelerating the track actuator. The deceleration means includes first means for deriving a deceleration time T based on the beam moving velocity V at a track which precedes the target track and supplying a deceleration pulse to the track actuator for the deceleration time T starting from a time when the light beam is a predetermined distance from the target track. According to the deceleration control system of the present invention, it is possible to realize a high-speed access with a greatly improved seek error rate because a track jump can be carried out with a stable light beam.

Still another object of the present invention is to provide the deceleration control system described above wherein the deceleration means further includes second means for calculating a start timing of the deceleration pulse so that the beam moving velocity V becomes zero at a center of the target track. According to the deceleration control system of the present invention, it is possible to control the position of the light beam to the center of the target track when the deceleration ends, regardless of the beam moving velocity V.

Other objects and further features of the present invention will be apparent from the following detailed description when read in conjunction with the accompanying drawings.

BRIEF DESCRIPTION OF THE DRAWINGS

FIG. 8 is a timing chart for explaining a track jump of the first embodiment;
FIGS. 10A and 10B are diagrams for explaining the deceleration time used in the first embodiment.

DESCRIPTION OF THE PREFERRED EMBODIMENTS

Figure 1:
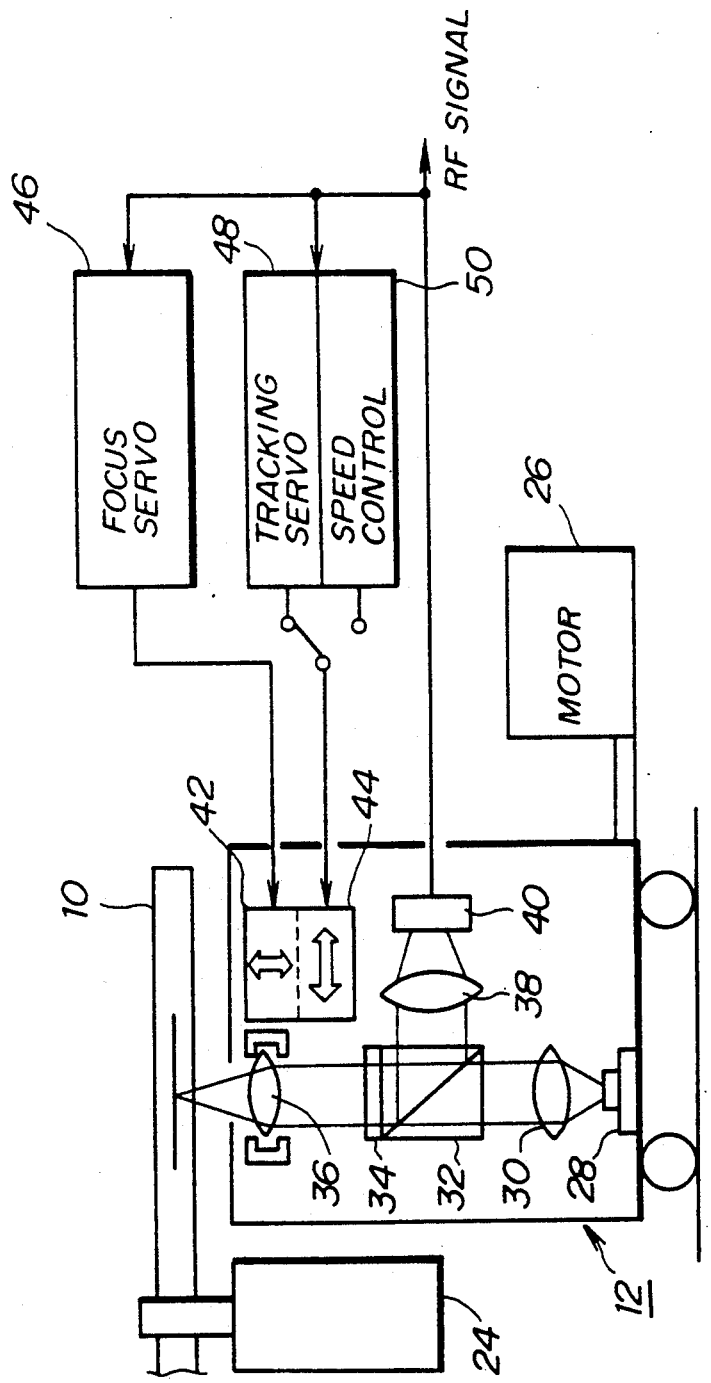
FIG. 1 is a diagram showing an essential part of an example of a conventional optical disk unit.
Figures 2A, 2B:
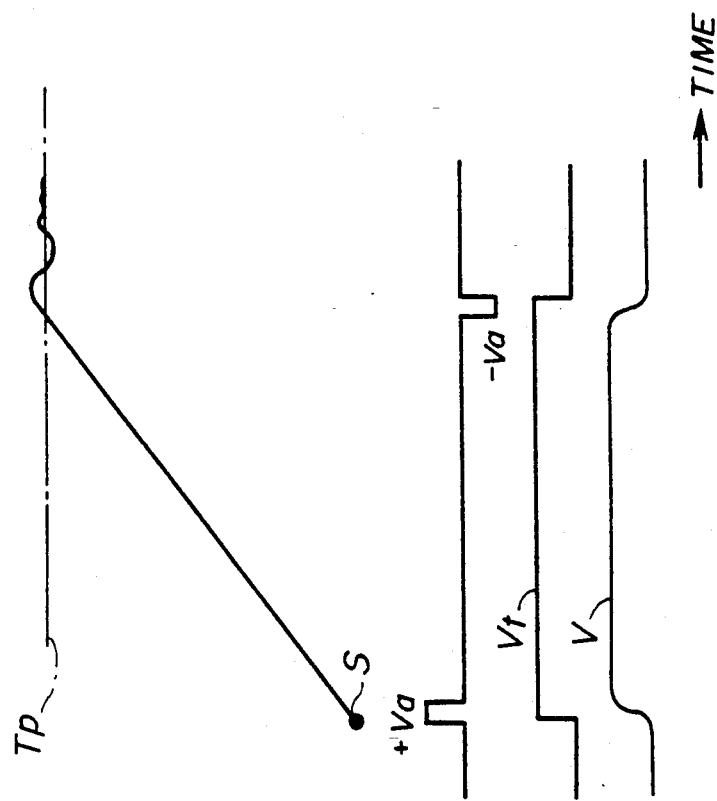
FIGS. 2A and 2B are diagrams for explaining a conventional track jump.
Figure 3A:
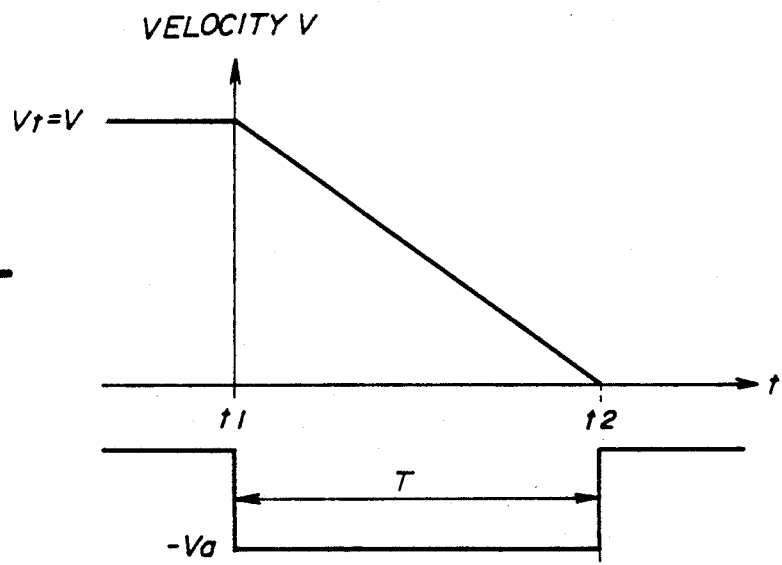
FIGS. 3A through 3C are diagrams for explaining a conventional deceleration control.
Figure 3B:
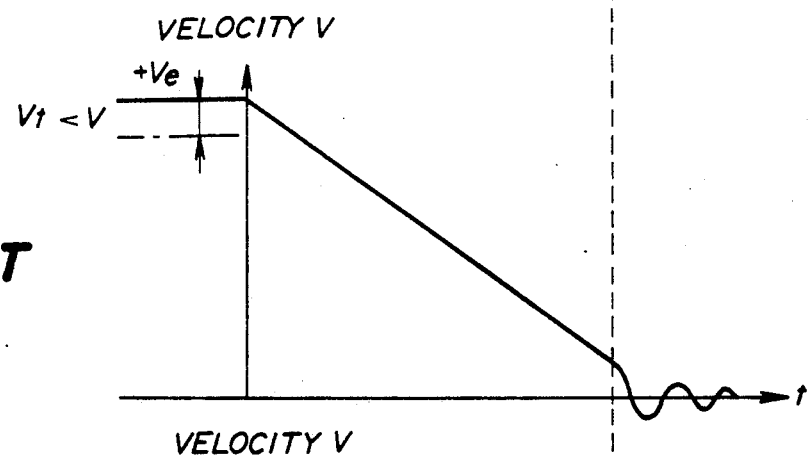
Figure 3C:
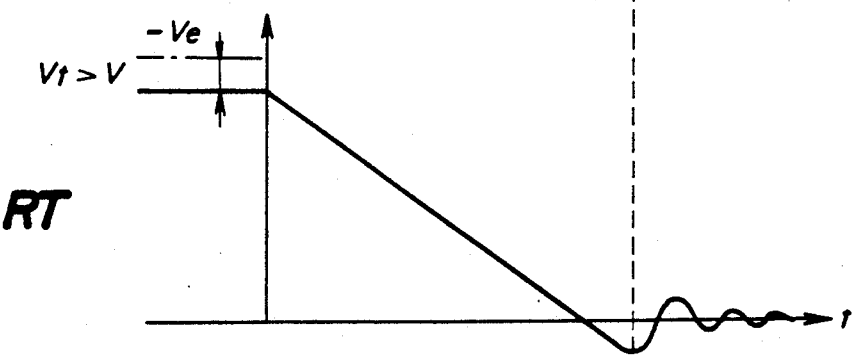
Figure 4:
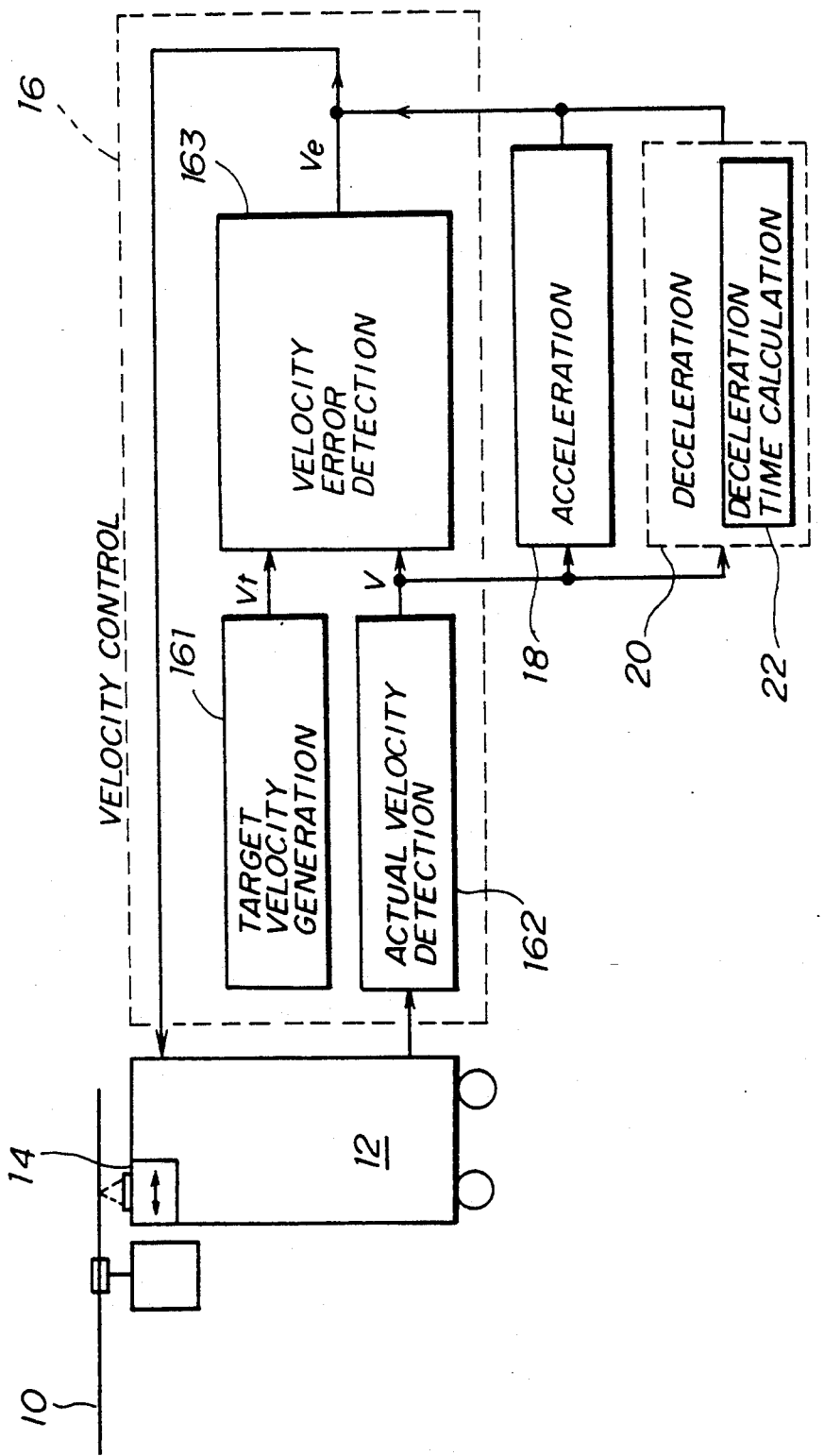
FIG. 4 is a system block diagram showing an essential part of an optical disk unit to which a first embodiment of a deceleration control system according to the present invention is applied.
Figure 5:
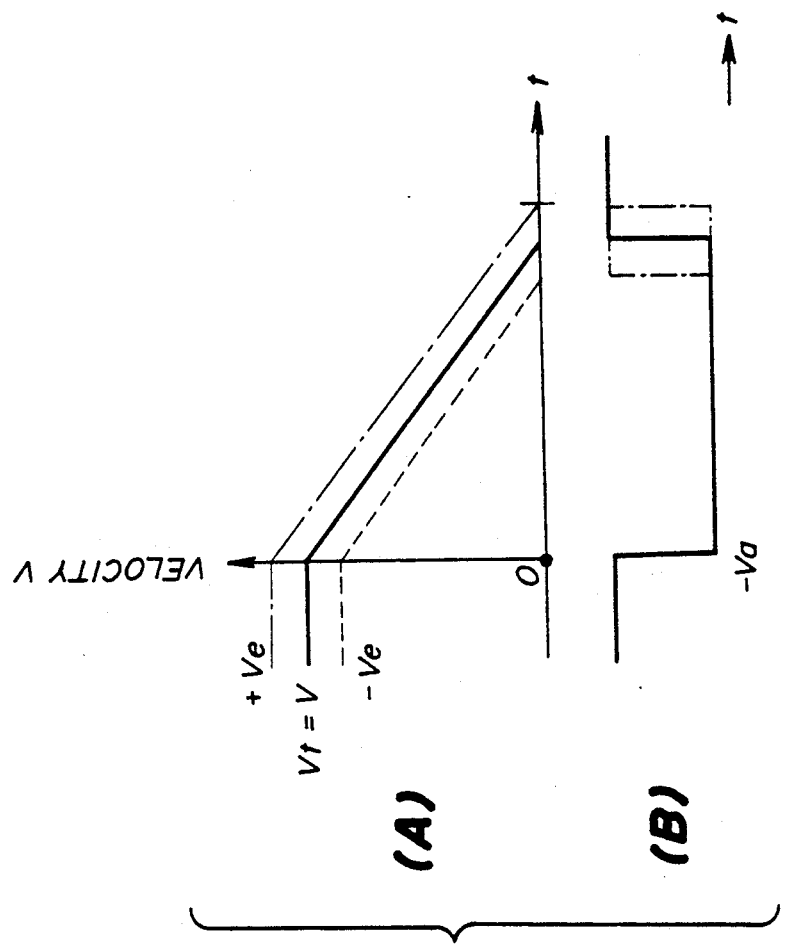
FIG. 5 is a diagram for explaining a deceleration control in the first embodiment.

First, a description will be given of an operating principle of a first embodiment of a deceleration control system according to the present invention, by referring to FIGS. 4 and 5. FIG. 4 shows an essential part of an optical disk unit to which the first embodiment is applied, and FIG. 5 is a diagram for explaining a deceleration control in the first embodiment.

In FIG. 4, an optical head 12 records information on and/or reproduces information from tracks which are formed on an optical disk 10 which is rotated at a constant velocity. The optical head 12 includes a track actuator 14 which moves a light beam which is emitted from the optical head 12 in a direction traversing the tracks on the optical disk 10.

A velocity control means 16 controls the track actuator 14 when making a track jump. The velocity control means 16 includes a target velocity generation means 161, am actual velocity detection means 162 and a velocity error detection means 163. When making the track jump, the target velocity generation means 161 of the velocity control means 16 generates a target velocity $V_t$, the actual velocity detection means 162 detects a beam moving velocity V based on a tracking error signal TES which is derived from an optical signal which is received by the optical head 12, and the velocity error detection means 163 detects a velocity error $V_e$ of the beam moving velocity V with respect to the target velocity $V_t$. The velocity error detection means 163 controls the velocity of the track actuator 14 so as to minimize the velocity error $V_e$.

In addition, an acceleration means 18 controls acceleration of the track actuator 14 at the start of the track jump, and a deceleration means 20 controls deceleration of the track actuator 14 at the end of the track jump.

This embodiment is characterized in that the deceleration means 20 is provided with a deceleration time calculation means 22 for calculating a deceleration time T based on the beam moving velocity V immediately before the target track and for outputting the deceleration pulse for the calculated deceleration time T. The deceleration time calculation means 22 generates the deceleration time T by multiplying a predetermined constant C to the beam moving velocity V which is detected immediately before the target track. In addition, the deceleration calculation means 22 generates the deceleration pulse for the deceleration time T after a predetermined loss time elapses from a time when the light beam passes a track which is one track before the target track. Furthermore, the velocity control means 16 detects the beam moving velocity V based on a period with which the zero crossing of the tracking error signal TES occurs.

According to this first embodiment, it is possible to calculate the deceleration time T dependent on the beam moving velocity V which has the velocity error $V_e$ with respect to the target velocity $V_t$ at the start of the deceleration. Hence, the beam moving velocity V can be adjusted during this deceleration time T to become zero immediately before the tracking servo operation starts. Therefore, the beam position becomes stable after the tracking servo starts, and the access time of the track jump can be reduced effectively.

FIG. 5(A) shows the beam moving velocity V, and FIG. 5(B) shows a deceleration pulse having a deceleration voltage $-V_a$ which is applied to the track actuator 14 to adjust the beam moving velocity V. As may be seen from FIG. 5(B), the duration of the deceleration pulse is variable depending on the velocity error $V_e$.

Figure 6:
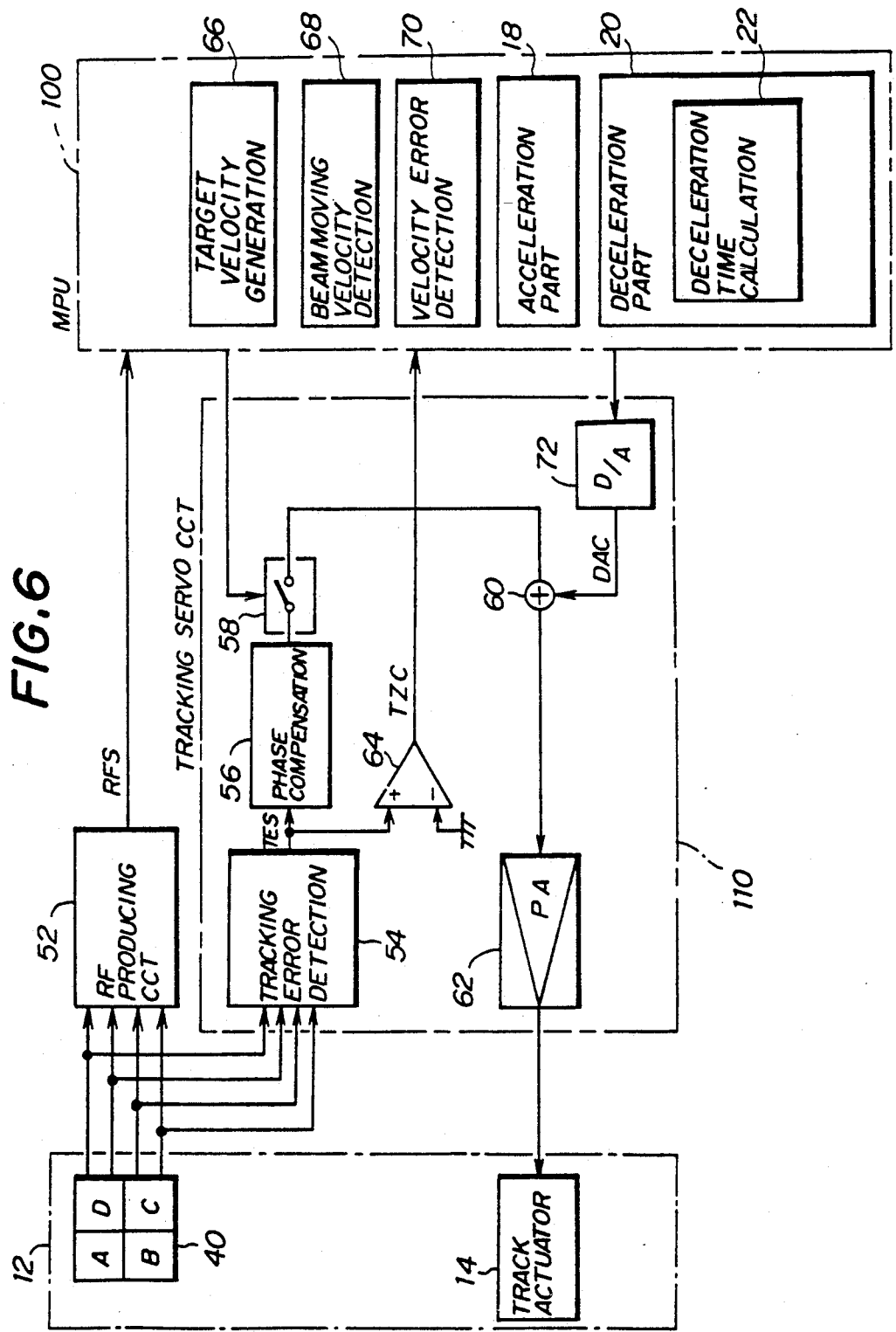
FIG. 6 is a system block diagram showing the optical disk unit to which the first embodiment is applied in more detail.

Next, a more detailed description will be given of the first embodiment, by referring to FIG. 6. In FIG. 6, the optical head 12 includes the track actuator 14 for moving the light beam emitted from the optical head 12 in a direction traversing the tracks on the optical disk 10, and a 4-segment photodetector 40 for receiving the light beam from the optical disk 10.

Four light detection signals output from the 4-segment photodetector 40 are supplied to an RF producing circuit 52 which obtains a high-frequency reproduced signal RFS as a sum of the light detection signals and supplies the high-frequency reproduced signal RFS to a microprocessor unit (MPU) 100. The four light detection signals from the 4-segment photodetector 40 are also supplied to a tracking error detection circuit 54 which detects a tracking error signal TES. In other words, the tracking error detection circuit 54 detects the tracking error signal TES which can be described by $(A+D)-(B+C)$, where $(A+D)$ is a sum of the light detection signals from light receiving parts A and D of the 4-segment photodetector 54 and $(B+C)$ is a sum of the light detection signals from light receiving parts B and C of the 4-segment photodetector 54. The tracking error signal TES output from the tracking error detection circuit 54 is supplied to a phase compensation circuit 56 wherein an advanced phase compensation is carried out, for example. An output signal of the phase compensation circuit 56 is supplied to a power amplifier 62 via a switch 58 and an adder 60. The switch 58 is provided to control the ON/OFF state of the tracking servo. The track actuator 14, that is, a tracking coil, is driven by an output signal of the power amplifier 62.

A tracking servo circuit 110 includes the tracking error detection circuit 54, the phase compensation circuit 56, the switch 58, the adder 60, the power amplifier 62, a zero crossing comparator 64 and a digital-to-analog (D/A) converter 72 which are connected as shown.

The velocity control means for controlling the track jump is realized by a program control of the MPU 100.

First, in order to detect the beam moving velocity (actual velocity) V, the tracking error signal TES is supplied to a non-inverting input terminal of the zero crossing comparator 64. An inverting input terminal of the zero crossing comparator 64 is grounded. The zero crossing comparator 64 outputs a signal which is inverted with every zero crossing which occurs when the light beam traverses a track by the track jump control. For example, it is possible to detect the track pitch passing time from the period of the falling edges of the output signal of the zero crossing comparator 64. The track pitch passing time is the time it takes for the light beam to pass one track pitch of the tracks on the optical disk 10.

The MPU 100 is provided with means for realizing functions of a target velocity generation part 66, a velocity error detection part 70, an acceleration part 18, and a deceleration part 20. The deceleration part 20 includes a deceleration time calculation part 22.

The target velocity generation part 66 generates the target velocity $V_t$ which is predetermined depending on a constant target velocity or a number of remaining tracks to the target track when making the track jump. The beam velocity detection part 68 measures one track passing time of the light beam, and detects the beam moving velocity V by dividing a track pitch $T_p$ by the track passing time. The track passing time is the time it takes for the light beam to pass one track. For example, in the case of the so-called 5-inch optical disk, $T_p=1.6$ μm.

The velocity error detection part 70 detects the velocity error $V_e$ by subtracting the beam moving velocity V from the target velocity $V_t$. The velocity error $V_e$ detected by the velocity error detection part 70 is converted into an analog velocity error voltage in the D/A converter 71 and is supplied to the power amplifier 62 via the adder 60, so as to control the velocity of the track actuator 14. Of course, the switch 58 is OFF, that is, the tracking servo is OFF, when controlling the velocity of the track actuator 14.

The acceleration part 18 outputs an acceleration (voltage) pulse having the voltage $+V_a$ for the constant acceleration time by setting acceleration data in the D/A converter 72 when starting the track jump. In addition, the deceleration part 20 outputs a deceleration (voltage) pulse having the voltage $-V_a$ for the deceleration time T by setting deceleration data in the D/A converter 72.

The time in which the deceleration part 20 generates the deceleration pulse, that is, the deceleration time T, is obtained by the deceleration time calculation part 22. The deceleration time calculation part 22 calculates the deceleration time T based on the beam moving velocity V at the time when the zero crossing of the tracking error signal TES is detected as the light beam traverses the track which is one track before the target track. For example, the deceleration time calculation part 22 calculates the deceleration time T by multiplying a predetermined constant C to the beam moving velocity V immediately before the target track is reached, as described by the following formula (1).

$$T = C \times V \quad (1)$$

In the formula (1) given above, the value of the constant C is determined by the deceleration which occurs by the control of the track actuator 14 based on the deceleration voltage $-V_a$ which is a maximum voltage with respect to the power amplifier 62. Particularly, C is obtained from $C = 1/(\text{deceleration})$.

Furthermore, the deceleration time calculation part 22 generates the deceleration pulse for the deceleration time T which is calculated after a predetermined loss time from the zero crossing timing of the tracking error signal TES at the track which is one track before the target track, so that the beam moving velocity V becomes zero at a position which is as close to the center of the target track as possible.

Figure 7A:
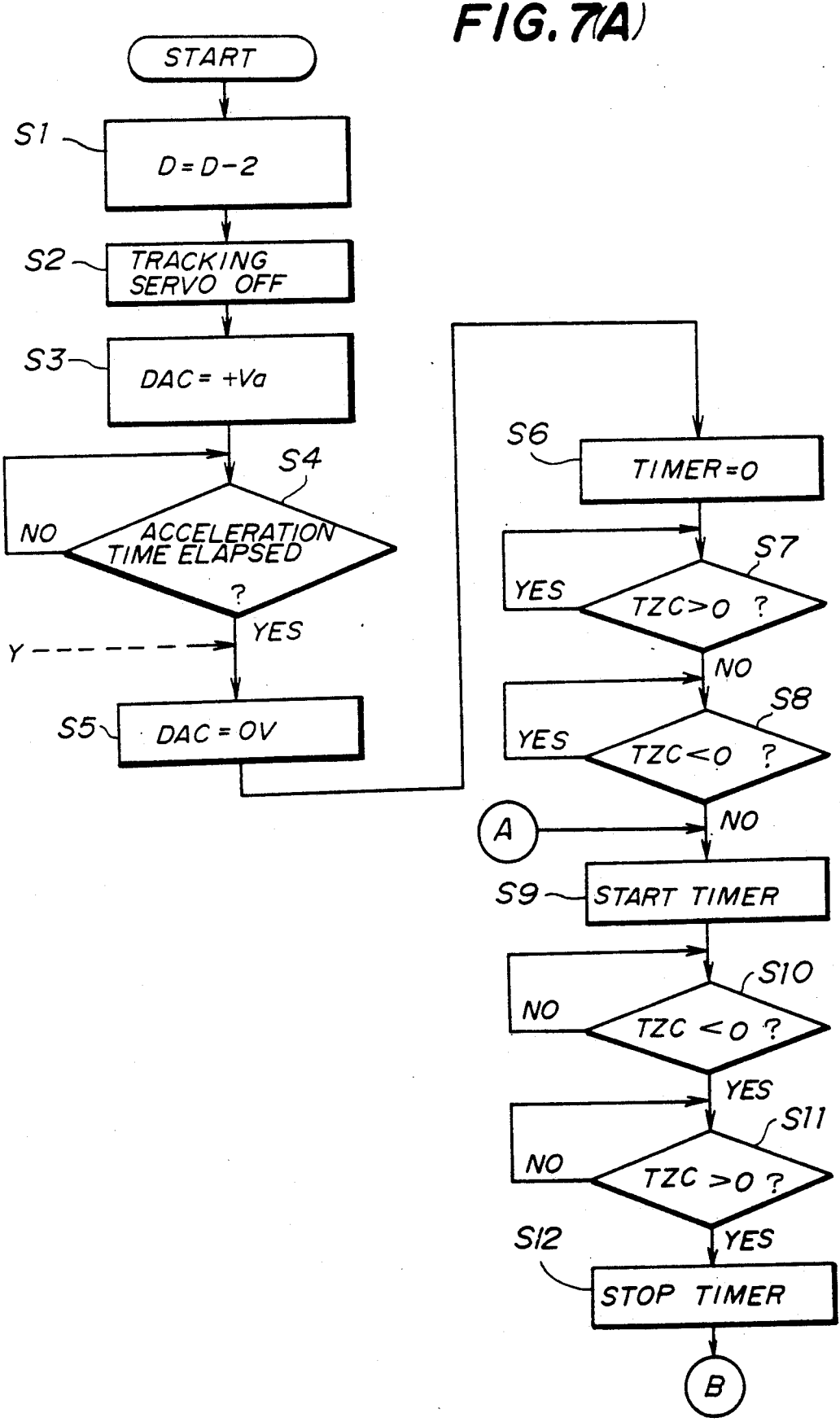
FIG. 7 is a flow chart for explaining a track jump control of an MPU shown in FIG. 6.
Figure 7B:
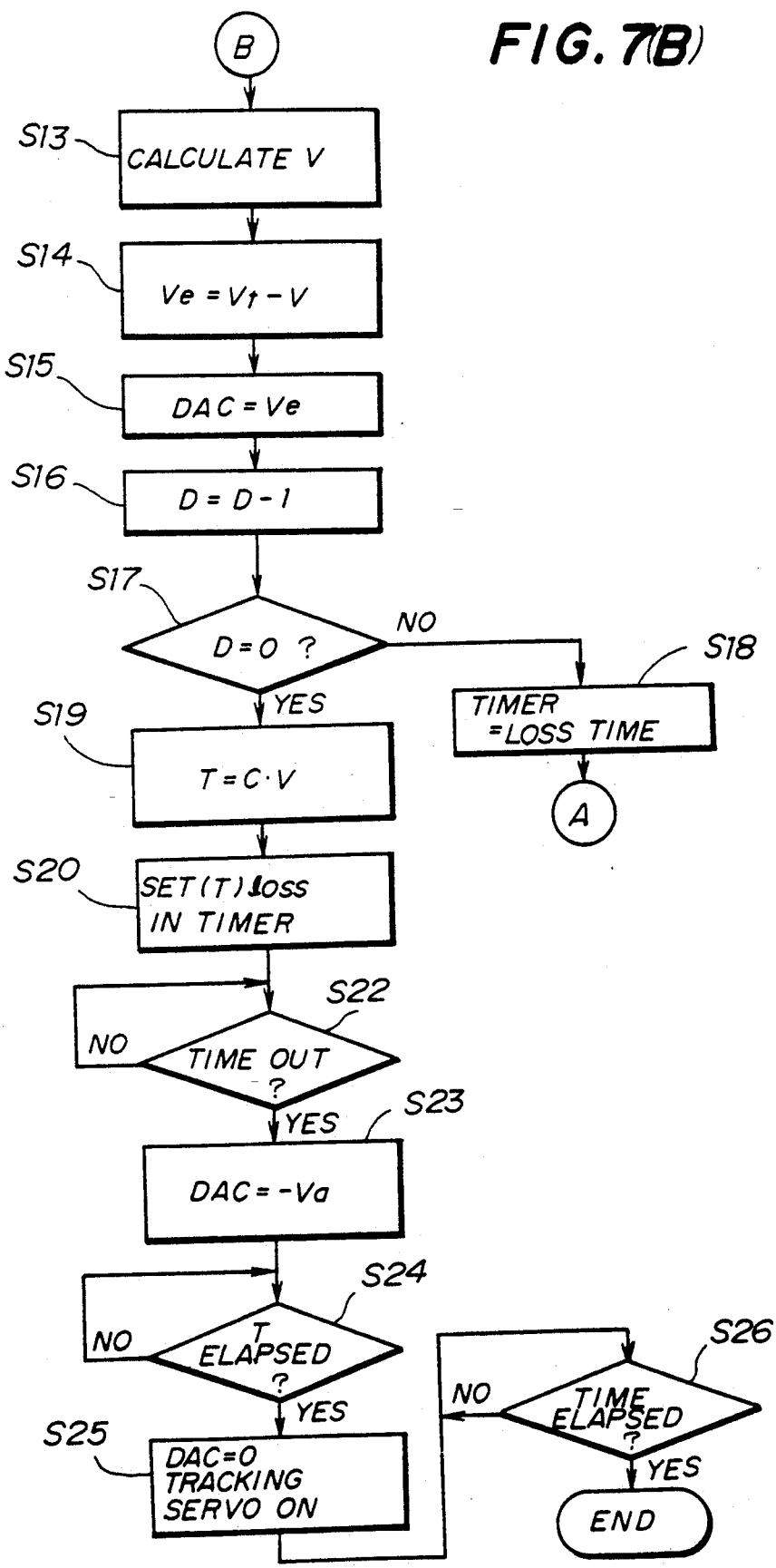

Next, a description will be given of the track jump control of the MPU 100 by referring to the flow chart of FIG. 7.

When a track jump instruction is supplied to the MPU 100, a step S1 sets an access difference, that is, a remaining number of tracks D with respect to the target track to $D = D - 2$. The access difference D is decremented by two by taking into account the fact that the acceleration control is made at the first track when starting the track jump and the deceleration control is made at the last track when ending the track jump.

A step S2 turns the tracking servo OFF. In FIG. 6, this is achieved by turning OFF the switch 58.

A step S3 sets the predetermined acceleration voltage $+V_a$ in the D/A converter 72. A step S4 judges whether or not the acceleration time has elapsed. When the judgement result in the step S4 becomes YES, the acceleration control is ended by a step S5 which sets the D/A converter 72 to the zero volt output. Steps S6 through S17 which follow correspond to a velocity control routine.

The step S6 sets an internal timer of the MPU 100 to zero, and steps S7 and S8 detect from the output signal TZC of the zero crossing comparator 64 whether or not the tracking error signal TES has become zero. In other words, the step S7 judges whether or not the output signal TZC of the zero crossing comparator 64 is greater than zero, and the step S8 judges whether or not the output signal TZC is less than zero when the judgement result in the step S7 becomes NO. When the zero crossing of the tracking error signal TES is detected and the judgement result in the step S8 becomes NO, a step S9 starts the internal timer of the MPU 100. Then, steps S10 and S11 detect from the output signal TZC of the zero crossing comparator 64 whether or not the tracking error signal TES has become zero. In other words, the step S10 judges whether or not the output signal TZC of the zero crossing comparator 64 is less than zero, and the step S11 judges whether or not the output signal TZC is greater than zero when the judgement result in the step S10 becomes YES. When the zero crossing of the tracking error signal TES is detected and the judgement result in the step S11 becomes YES, a step S12 stops the internal timer of the MPU 100.

FIG. 8 is a timing chart for explaining the track jump. FIG. 8(A) shows the tracking error signal TES, FIG. 8(B) shows the output signal TZC of the zero crossing comparator 64, and FIG. 8(C) shows the output signal DAC of the D/A converter 72. For example, the steps S6 through S12 described above measure the period of the rising edges of the output signal TZC of the zero crossing comparator 64.

The polarity of the output signal TZC and the polarity of the output signal DAC respectively are inverted depending on the direction of the track jump.

After the step S12, a step S13 calculates the beam moving velocity V based on the counted value of the internal timer of the MPU 100 and the track pitch $t_p$. A step S14 obtains the velocity error $V_e$ by subtracting the beam moving velocity V from the target velocity $V_t$, and a step S15 sets the velocity error $V_e$ in the D/A converter 72.

Because the light beam passes one track, a step S16 decrements the access difference D by one, that is, sets D to $D = D - 1$. A step S17 judges whether or not $D = 0$, that is, whether or not the light beam has reaches the track which is one track before the target track. When the judgement result in the step S17 is NO, a step S18 sets in the internal timer of the MPU 100 a loss time which is required to carry out the velocity control routine, and the process returns to the step S9 to calculate the beam moving velocity V.

By repeating the steps S9 through S18 described above, the track actuator 14 controls the light beam towards the target track so that the beam moving velocity V becomes the target velocity $V_t$.

When the judgement result in the step S17 becomes YES during the velocity control routine, it is judged that the light beam has reached the track which is one track before the target track and a step S19 calculates the deceleration time T. The deceleration time T is calculated by multiplying the constant C to the beam moving velocity V which is obtained in the step S13.

Next, a step S20 sets a predetermined loss time (T)loss in a deceleration timer of the MPU 100 used for the deceleration control. This predetermined loss time (T)loss is used to adjust the deceleration start timing so that the beam moving velocity V becomes zero when the light beam reaches the center of the target track by the deceleration control which is carried out for the deceleration time T. For example, the predetermined loss time (T)loss is dependent on a processing time which is required to carry out the program steps.

A step S22 judges whether or not the predetermined loss time (T)loss set in the deceleration timer has elapsed. When the judgement result in the step S22 becomes YES, a step S23 sets the deceleration voltage $-V_a$ in the D/A converter 72 and starts the deceleration control. A step S24 judges whether or not the deceleration time T which is obtained in the step S19 has elapsed. When the judgement result in the step S24 becomes YES, a step S25 sets zero in the D/A converter 72 and stops the deceleration control, so as to end the track jump control and turn ON the tracking servo to enter a fine control mode (or fine seek mode). Finally, a step S26 judges whether or not a predetermined control time has elapsed, and the series of operations to carry out the track jump control are ended when the judgement result in the step S26 becomes YES.

As shown in FIG. 8, the acceleration control is carried out by outputting the acceleration voltage $+V_a$ for the acceleration time from the start of the track jump.

Then, from the second track, the beam moving velocity V is detected based on the period of the rising edges of the output signal TZC of the zero crossing comparator 64. The velocity control is started by obtaining the velocity error $V_e$ from the detected beam moving velocity V and the target velocity $V_t$. In other words, the velocity control is carried out during the times (or first through nth periods) indicated as "1", "2", ..., "n−1" and "n" in FIG. 8(B). The access difference D becomes zero at the zero crossing timing of the time "n" of the output signal TZC of the zero crossing comparator 64, and the deceleration time T is calculated from the beam moving velocity V at this point in time. The deceleration voltage $-V_a$ is output for the deceleration time T to decelerate the beam moving velocity V after the predetermined loss time (T)loss elapses.

Figure 9A:
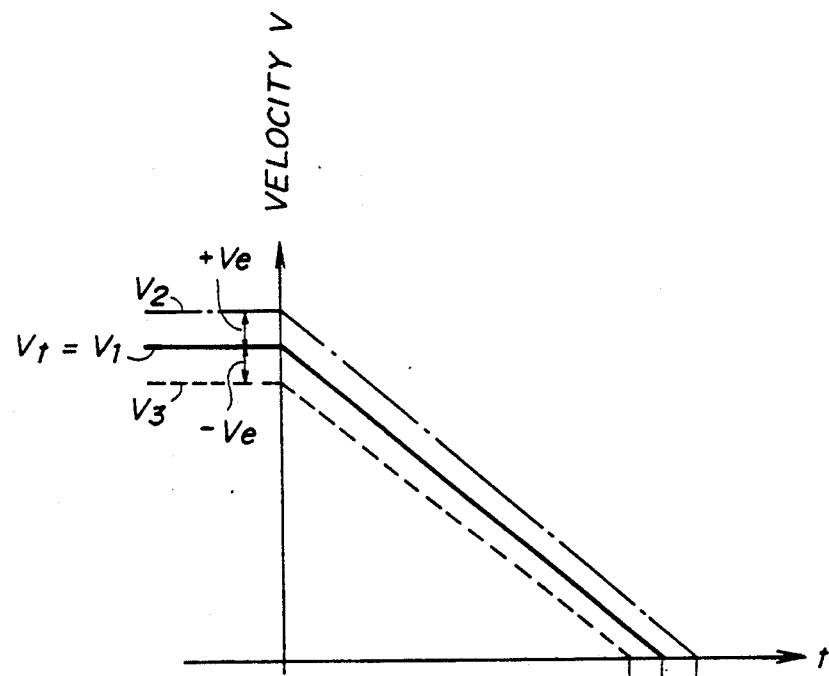
FIGS. 9A and 9B are diagrams for explaining a deceleration control of the first embodiment.
Figure 9B:
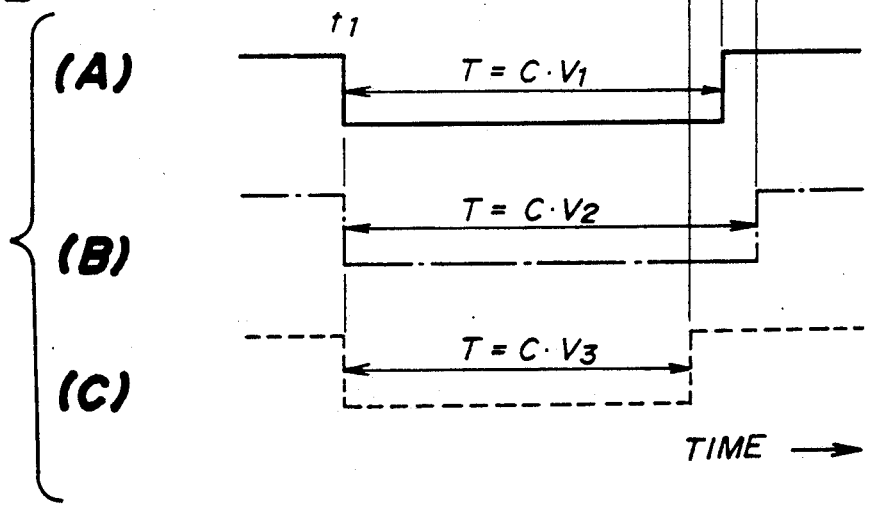

FIGS. 9A and 9B are diagrams for explaining the deceleration control of the first embodiment. FIG. 9A shows the beam moving velocity V at a time t1 when the deceleration control starts. The beam moving velocity V may be V1 as indicated by a solid line, V2 as indicated by a one-dot chain line, or V3 as indicated by a phantom line. The beam moving velocity V1 is equal to the target velocity $V_t$. A velocity error $+V_e$ exists between the beam moving velocity V2 and the target velocity $V_t$. A velocity error $-V_e$ exists between the beam moving velocity V3 and the target velocity $V_t$.

First, in the case where $V=V1=V_t$, the velocity error $V_e=0$. The deceleration time T can be described by $T=C\times V1=C\times V_t$ as shown in FIG. 9B(A). Hence, the beam moving velocity V1 becomes zero when the deceleration ends.

Next, in the case where $V=V2>V_t$, the deceleration time T can be described by $T=C\times V2$ which is a longer deceleration time compared to the above described case where $V_e=0$. In other words, the deceleration time T is longer by a time which corresponds to the velocity error $+V_e$, and the beam moving velocity V2 positively becomes zero when the deceleration ends.

On the other hand, in the case where $V=V3<V_t$, the deceleration time T can be described by $T=C\times V3$ which is a shorter deceleration time compared to the above described case where $V_e=0$. In other words, the deceleration time T is shorter by a time which corresponds to the velocity error $-V_e$, and the beam moving velocity V3 positively becomes zero when the deceleration ends.

Therefore, even when the beam moving velocity V includes the velocity error $V_e$ at the start of the deceleration, the deceleration time T is calculated depending on the beam moving velocity V at the time when the deceleration starts, and the deceleration control is carried out for this deceleration time T. For this reason, the beam moving velocity V can be made exactly zero at the end of the deceleration control, and the velocity error $V_e$ does not exist when the tracking servo starts. Consequently, the beam position is stable when the tracking servo is ON, and a high-speed access can be realized by the reduction of the access time which is required for the track jump.

However, according to the first embodiment which outputs the deceleration pulse for the deceleration time T which is calculated depending on the beam moving velocity V, the position where the deceleration of the light beam ends on the optical disk differs depending on the calculated deceleration time T.

For example, when the the beam moving velocity V is equal to the target velocity $V_t$, the beam moving velocity V can be controlled to zero at the center of the target track as shown in FIG. 10A by the deceleration control during the deceleration time T. FIG. 10A(A) shows the tracking error signal TES and FIG. 10A(B) shows the beam moving velocity V.

However, when the beam moving velocity V is small, the calculated deceleration time T becomes short as shown in FIG. 10B. In this case, the deceleration ends before reaching the center of the target track. FIG. 10B(A) shows the tracking error signal TES and FIG. 10B(B) shows the beam moving velocity V. Hence, in this case, an undershoot US occurs before the light beam is pulled into the center of the target track by the tracking servo, and the beam position becomes unstable. Similarly, when the beam moving velocity V is large, the calculated deceleration time T becomes long, the light beam exceeds the center of the target track by the end of the deceleration and an overshoot occurs.

It is desirable to prevent such undershoot and overshoot which occurs at the end of the deceleration control. Accordingly, a description will now be given of a second embodiment of the deceleration control system according to the present invention in which this problem can be eliminated.

Figure 11:
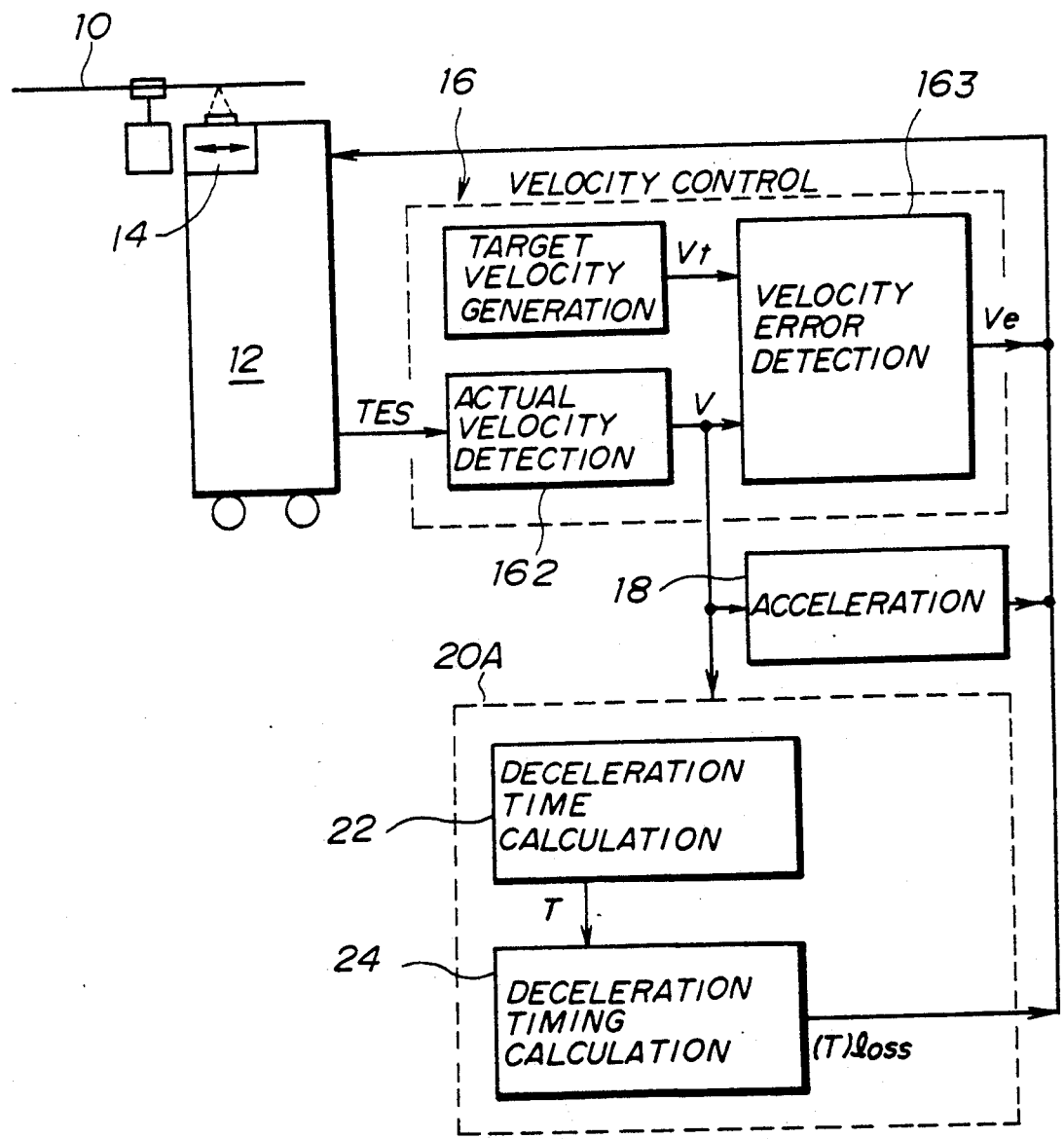
FIG. 11 is a diagram for explaining an operating principle of a second embodiment of the deceleration control system according to the present invention.

A description will first be given of an operating principle of the second embodiment, by referring to FIGS. 11 and 12. FIG. 11 shows an essential part of an optical disk unit to which the second embodiment is applied, and FIG. 12 is a diagram for explaining a deceleration control in the second embodiment. In FIG. 11, those parts which are the same as those corresponding parts in FIG. 4 are designated by the same reference numerals, and a description thereof will be omitted.

In FIG. 11, a deceleration means 20A includes in addition to the deceleration time calculation part 22 a deceleration timing control part 24. The deceleration timing calculation part 24 calculates a start timing of the deceleration control which is carried out for the deceleration time T which is calculated by the deceleration time calculation part 22.

The deceleration timing calculation part 24 calculates the loss time (T)loss from a position a predetermined track pitches before the center of the target track to a position where the deceleration starts. For example, the predetermined track pitches may be one track pitch or one and a half track pitches. Further, it is possible to set the predetermined track pitches to two or more track pitches. From the practical point of view, the predetermined track pitches is selected in a range of one to several track pitches.

Figure 12A:
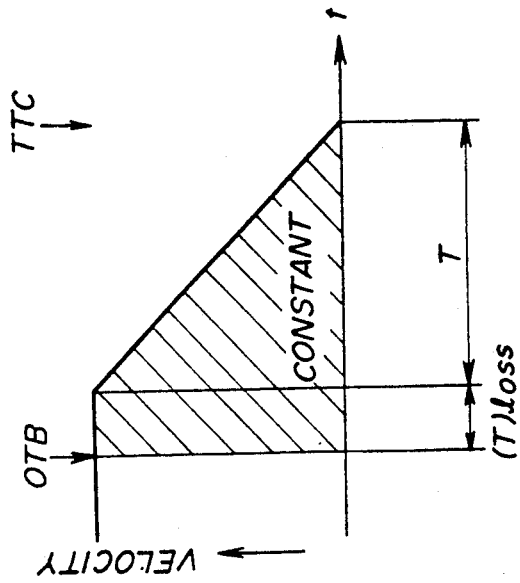
FIGS. 12A and 12B respectively are diagrams for explaining a deceleration control of the second embodiment for low and high beam moving velocities.
Figure 12B:
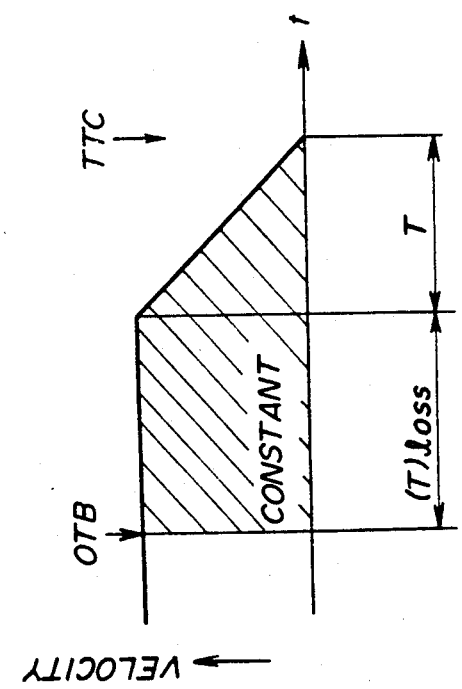

FIG. 12A shows the beam moving velocity V during the deceleration in the second embodiment when the beam moving velocity V is small, and FIG. 12B shows the beam moving velocity V during the deceleration in the second embodiment when the beam moving velocity V is large. In FIGS. 12A and 12B, OTB denotes a position which is one track before the target track and TTC denotes a position which corresponds to the center of the target track. The hatched areas shown in FIGS. 12A and 12B are the same and constant, which means that the deceleration ends exactly at the center of the target track.

In this embodiment, the deceleration timing calculation part 24 calculates the loss time (T) from the beam moving velocity V and the track pitch $T_p$ using one of the following formulas (2) and (3). The formula (2) is used when the predetermined track pitches is one track pitch, and the formula (3) is used when the predetermined track pitches is one and a half track pitches.

$$T_p = V \times (T)loss + VT/2 \qquad (2)$$

In other words, the loss time (T)loss is calculated as $(T)loss = (T_p/V) - (T/2)$ when the formula (2) is used. Of course, other than the formulas (2) and (3) may be used to calculate the loss time (T)loss.

According to this second embodiment, it is possible to calculate the deceleration time T dependent on the beam moving velocity V which has the velocity error $V_e$ with respect to the target velocity $V_t$ at the start of the deceleration. In addition, the start timing of the deceleration is controlled so that the deceleration ends at the center of the target track. Hence, the beam position becomes stable after the tracking servo starts, and the access time of the track jump can be reduced effectively.

Figure 13:
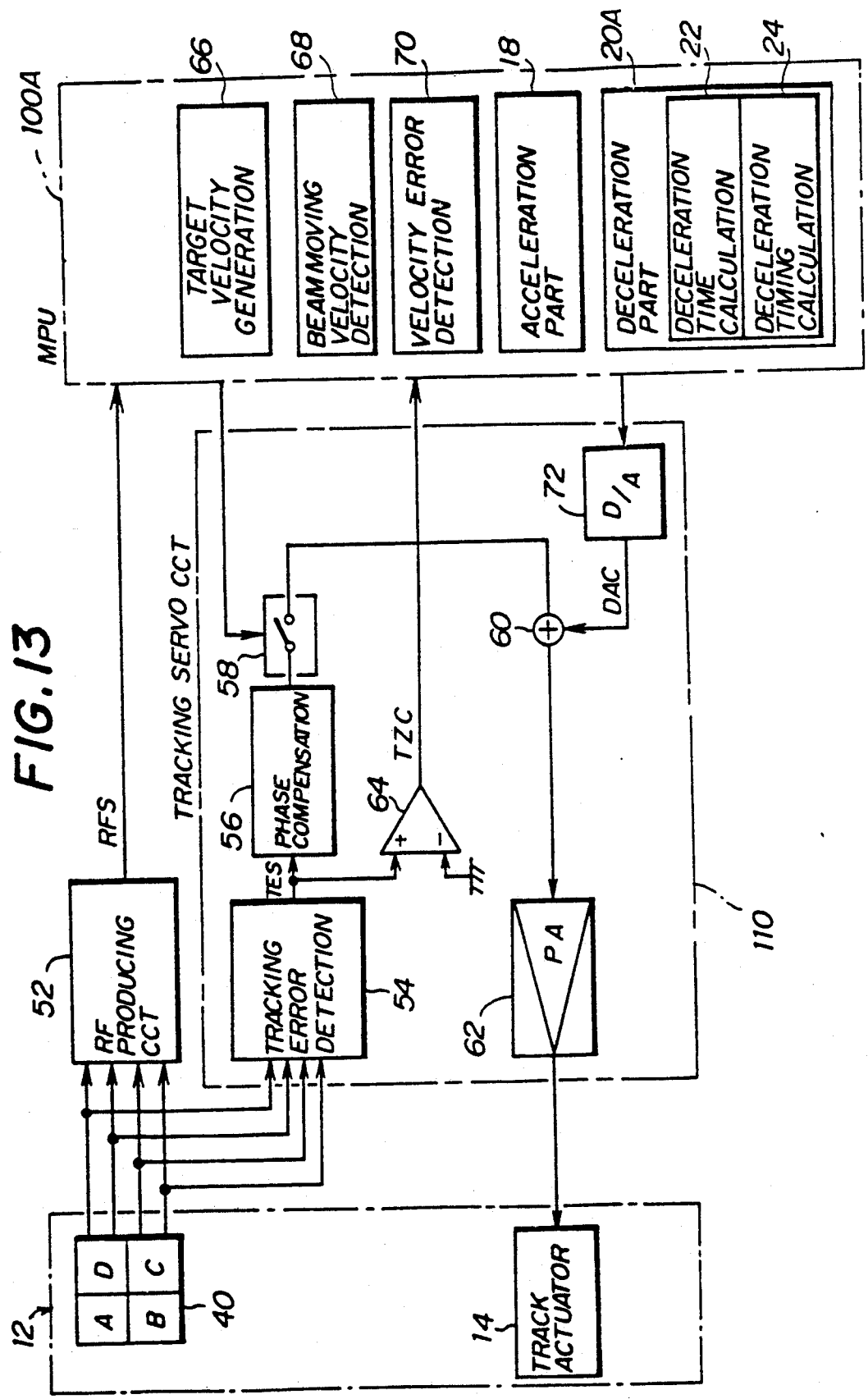
FIG. 13 is a system block diagram showing the optical disk unit to which the second embodiment is applied in more detail.

Next, a more detailed description will be given of the second embodiment, by referring to FIG. 13. In FIG. 13, those parts which are the same as those corresponding parts in FIG. 6 are designated by the same reference numerals, and a description thereof will be omitted.

An MPU 100A is provided with means for realizing functions of the target velocity generation part 66, the velocity error detection part 70, the acceleration part 18, and the deceleration part 20A, similarly as in the case of the MPU 100 of the first embodiment shown in FIG. 6. The deceleration part 20A includes the deceleration time calculation part 22 and the deceleration timing calculation part 24.

The deceleration time calculation part 22 calculates the deceleration time T based on the beam moving velocity V at the time when the track jump ends. On the other hand, the deceleration timing calculation part 24 calculates a start timing of the deceleration control which is carried out for the deceleration time T which is calculated by the deceleration time calculation part 22, so that the deceleration ends when the light beam reaches the center of the target track.

Based on the deceleration time T which is calculated in the deceleration time calculation part 22, the beam moving velocity V and the track pitch $T_p$, the deceleration timing calculation part 24 calculates the loss time (T)loss from a time when a zero crossing of the tracking error signal TES occurs one track before the target track to a time when the deceleration control starts.

Figure 14A:
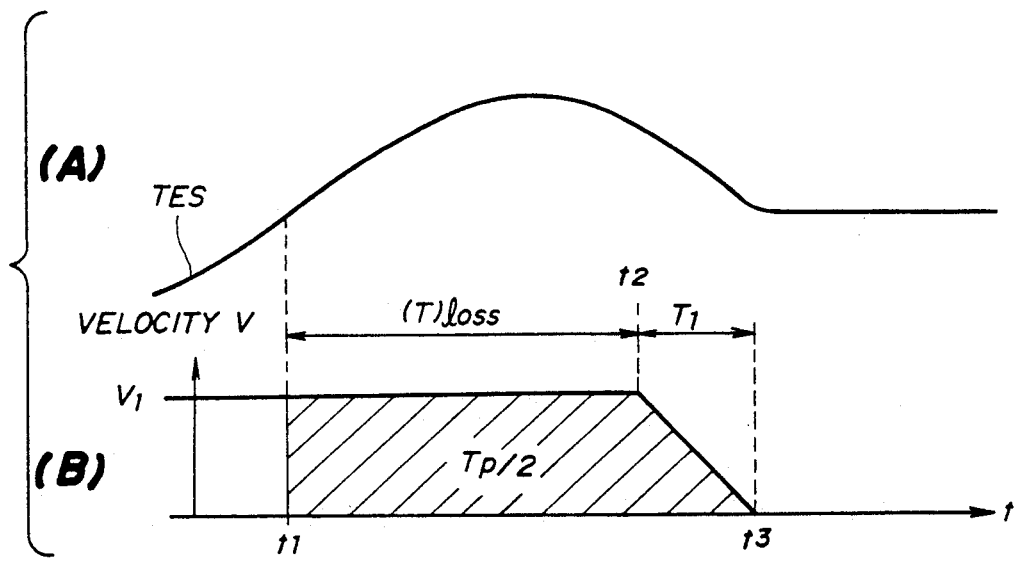
FIGS. 14A and 14B are diagrams for explaining a deceleration control of the second embodiment.
Figure 14B:
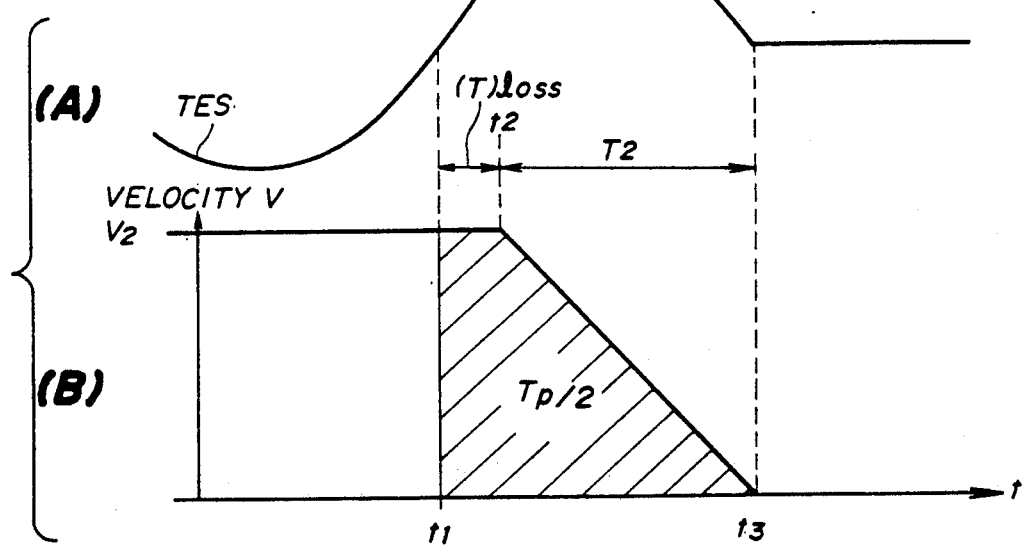

FIG. 14A shows the relationship of the tracking error signal TES and the beam moving velocity V when the beam moving velocity is small, and FIG. 14B shows the relationship of the tracking error signal TES and the beam moving velocity V when the beam moving velocity is large.

FIG. 14A(A) shows the tracking error signal TES and FIG. 14A(B) shows the beam moving velocity V. In the case shown in FIG. 14A where the beam moving velocity V is small, a deceleration time T1 can be obtained as $T1 = C \times V1$ from the formula (2) described above when V1 denotes the beam moving velocity V at a time t1 immediately before the target track where the zero crossing of the tracking error signal TES occurs. In order to end the deceleration control at the center of the target track at a time t3 by the deceleration during this deceleration time T1, the loss time (T)loss from the time t1 to a time t2 when the deceleration control starts is required. $T_p/2$ which is the moving distance from the time t1 to the time t3 is given by the hatched area of the velocity control from the time t1 to the time t3. As described above, the loss time $(T)loss = (T_p/2V1) - (T1/2)$ when the formula (3) is used.

Similarly, FIG. 14B(A) shows the tracking error signal TES and FIG. 14B(B) shows the beam moving velocity V. In the case shown in FIG. 14B where the beam moving velocity V is large, a deceleration time T2 can be obtained as $T2 = C \times V2$ from the formula (2) described above when V2 denotes the beam moving velocity V at the time t1 immediately before the target track where the zero crossing of the tracking error signal TES occurs. In order to end the deceleration control at the center of the target track at the time t3 by the deceleration during this deceleration time T2, the loss time (T)loss from the time t1 to the time t2 when the deceleration control starts is required. $T_p/2$ which is the moving distance from the time t1 to the time t3 is given by the hatched area of the velocity control from the time t1 to the time t3. As described above, the loss time $(T)loss = (T_p/2V1) - (T1/2)$ when the formula (3) is used.

In other words, the loss time (T)loss is the same and constant for the cases shown in FIGS. 14A and 14B.

That is, according to this embodiment, even when the beam moving velocities V at the zero crossing of the tracking error signal TES at a position which is one-half track pitch $T_p/2$ before the target track differ, the loss time (T)loss is obtained so that the area of the velocity control matches $T_p$, where this area of the velocity control is determined by the loss time (T)loss and the deceleration time T which is based on the beam moving velocity V. As a result, the deceleration control can be carried out so that the deceleration always ends at the center of the target track.

Figure 15A:
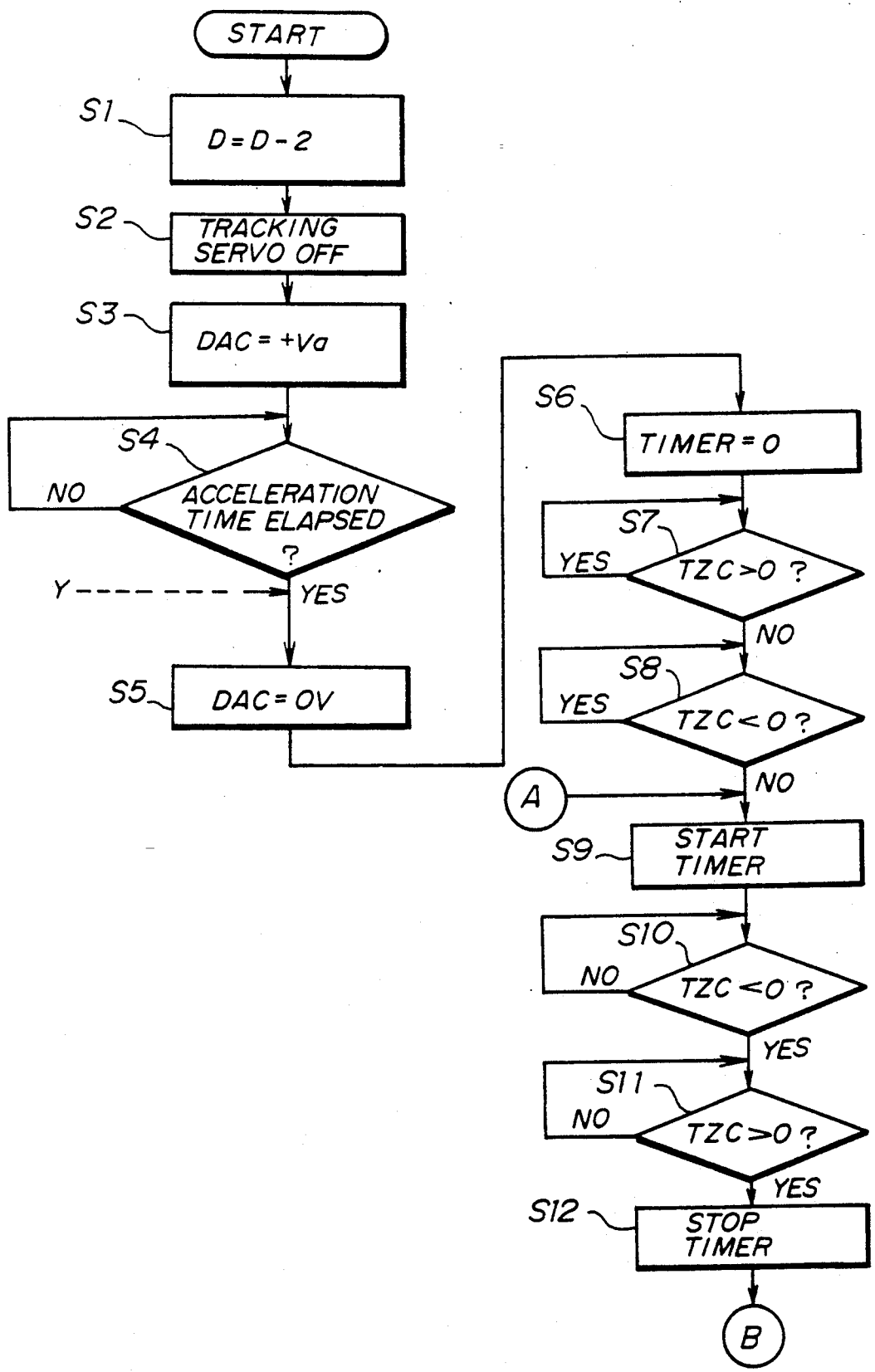
FIG. 15 is a flow chart for explaining a track jump control of an MPU shown in FIG. 13.
Figure 15B:
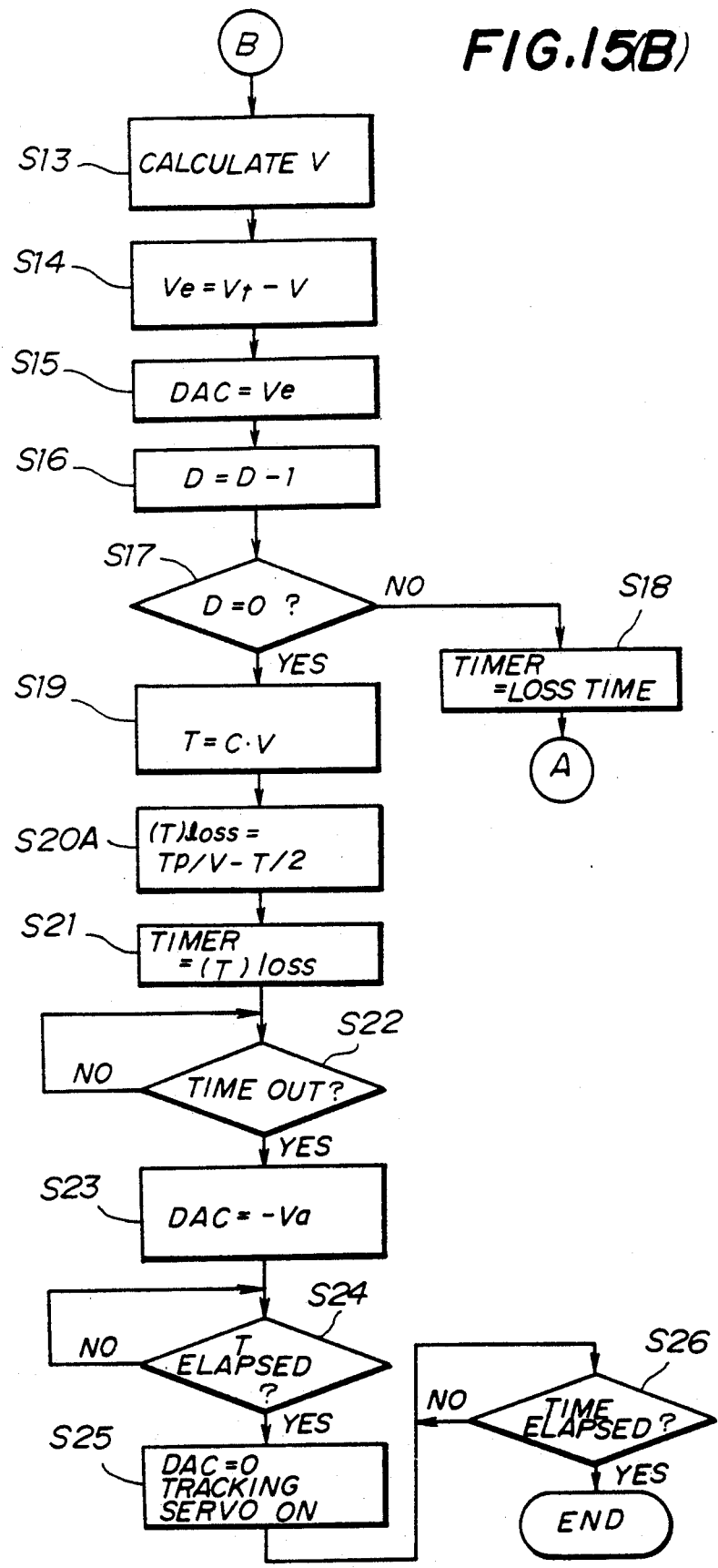

Next, a description will be given of the track jump control of the MPU 100A by referring to the flow chart of FIG. 15. In FIG. 15, those steps which are the same as those corresponding steps in FIG. 7 are designated by the same reference numerals, and a description thereof will be omitted.

In FIG. 15, the steps S1 through S18 are the same as those of the first embodiment. When the access difference D becomes zero and the zero crossing timing is one track pitch before the center of the target track, the judgement result in the step S17 becomes YES. Hence, the step S19 calculates the deceleration time T based on the formula (1). Then, a step S20A calculates the loss time (T)loss based on the formula (2). A step S21 sets the loss time (T)loss in the timer of the MPU 100A, and the step S22 judges whether or not the set loss time (T)loss is out. Thereafter, the steps S23 through S26 are carried out similarly as in the first embodiment.

Therefore, according to this second embodiment, the center of the target track is reached when the deceleration control ends and the beam moving velocity V becomes zero. Hence, when the tracking servo is turned ON in this state, it is possible to positively and accurately control the light beam on the target track without introducing instability of the beam position, and the read/write operation can be carried out immediately after the track jump.

In the second embodiment, the deceleration time T and the loss time (T)loss are calculated from the beam moving velocity V which is obtained with the zero crossing timing of the tracking error signal one track pitch $T_p$ before the center of the target track. However, when carrying out the deceleration control, the deceleration time T and the loss time (T)loss may be calculated from the beam moving velocity V which is obtained with the zero crossing timing of the tracking error signal one-half track pitch ($T_p/2$) before the center of the target track. In this case, the track pitch $T_p$ in the formula (3) is substituted by $T_p/2$ when calculating the loss time (T)loss.

In the embodiments described above, the present invention is applied to the track jump, that is, for the case where the light beam is first accelerated and thereafter decelerated. However, the application of the deceleration control system according to the present invention is not limited to the track jump, and may be applied to a case where a high-speed search is made, for example. In this case, the steps S1 through S4 shown in FIGS. 7 and 15 are not carried out, and the deceleration control starts from the step S5 as indicated by a phantom line Y.

Further, the present invention is not limited to these embodiments, but various variations and modifications may be made without departing from the scope of the present invention.

What is claimed is:

1. A deceleration control system having a velocity control and tracking servo operation for an optical disk unit which includes an optical head for recording information on and/or reproducing information from tracks of an optical disk by use of a light beam emitted form the optical head, a track actuator for moving the light beam in a direction traversing the tracks of the optical disk, and a tracking error signal generation circuit for deriving a tracking error signal TES from a signal which is output from the optical head and is dependent on a light beam received from the optical disk, said tracking error signal being generated every time the light beam traverses a track, said deceleration control system comprising:

velocity control means coupled to the optical head, said velocity control means including first means for generating a target velocity $V_t$, second means for detecting a beam moving velocity V based on the tracking error signal TES derived by the tracking error signal generation circuit, and third means for detecting a velocity error $V_e$ of the beam moving velocity V with respect to the target velocity $V_t$ and for controlling the track actuator so as to minimize the velocity error $V_e$; and deceleration means for decelerating the track actuator, said deceleration means including first means for deriving a deceleration time T based on the beam moving velocity V at a track which precedes the target track and supplying a single deceleration pulse to the track actuator for the deceleration time T starting from a time when the light beam is predetermined distance from the target track for stopping the light beam at the target track, wherein said deceleration pulse is output before said tracking servo operation begins.

2. The deceleration control system as claimed in claim 1, wherein said first means calculates the deceleration time T form a formula $T = C \times V$, where C denotes a predetermined constant and V denotes the beam moving velocity which is detected by said second means of said velocity control means immediately before the target track,.

3. The deceleration control system as claimed in claim 1, wherein said first means generates the deceleration pulse after a predetermined loss time (T)loss from a time when the light beam passes a predetermined track which precedes the target track.

4. The deceleration control system as claimed in claim 3, wherein said predetermined track is located one track before the target track.

5. The deceleration control system as claimed in claim 1, wherein said second means of said velocity control means detects the beam moving velocity V based on a period with which zero crossings of the tracking error signal TES occur.

6. The deceleration control system as claimed in claim 1, which further comprises acceleration means for accelerating the track actuator when starting a track jump, said deceleration means decelerating the track actuator when ending the track jump.

7. The deceleration control system as claimed in claim 6, wherein said acceleration means supplies to the track actuator an acceleration pulse having a polarity opposite to that of the deceleration pulse supplied by said deceleration means.

8. A deceleration control system having a velocity control and a tracking servo operation for an optical disk unit which includes an optical head for recording information on and/or reproducing information from tracks of an optical disk by use of a light beam emitted form the optical head, a track actuator for moving the light beam in a direction traversing the tracks of the optical disk, and a tracking error signal generation circuit for deriving a tracking error signal TES from a signal which is output from the optical head and is dependent on a light beam received from the optical disk, said tracking error signal being generated every time the light beam traverses a track, said deceleration control system comprising:

velocity control means coupled to the optical head, said velocity control means including first means for generating a target velocity $V_t$, second means for detecting a beam moving velocity V based on the tracking error signal TES derived by the tracking signal error signal generation circuit, and a third means for detecting a velocity error $V_e$ of the beam moving velocity V with respect to the target velocity $V_t$ and for controlling the track actuator so as to minimize the velocity error $V_e$; and deceleration means for decelerating the track actuator, said deceleration means including first means for deriving a deceleration time T based on the beam moving velocity V at a track which precedes the target track and supplying a single deceleration pulse to the track actuator for the deceleration time T starting from a time when the light beam is a predetermined distance form the target track, and second means for calculating a start timing of the deceleration pulse so that the beam moving velocity V becomes zero at a center of the target track, wherein said deceleration pulse is output before said tracking servo operation begins.

9. The deceleration control system as claimed in claim 8, wherein said second means calculates the start timing of the deceleration pulse by calculating a loss time (T)loss from a time when the light beam passes a predetermined track which precedes the target track and a time when the deceleration pulse starts.

10. The deceleration control system as claimed in claim 9, wherein said predetermined track is located one track pitch before the target track.

11. The deceleration control system as claimed in claim 10, wherein said second means calculates the loss time (T)loss using a formula $T_p = V \times (T)loss + VT/2$, where $T_p$ denotes a track pitch of the tracks of the optical disk.

12. The deceleration control system as claimed in claim 9, wherein said predetermined track is located one-half track pitch before the target track.

13. The deceleration control system as claimed in claim 12, wherein said second means calculates the time loss (T)loss using a formula $T_p/2 = V \times (T)loss + VT/2$, where $T_p$ denotes a track pitch of the tracks of the optical disk.

14. The deceleration control system as claimed in claim 8, wherein said first means calculates the deceleration time T from a formula $T = C \times V$, where C denotes a predetermined constant and V denotes the beam moving velocity which is detected by said second means of said velocity control means immediately before the target track.

15. The deceleration control system as claimed in claim 8, wherein said second means of said velocity control means detects the beam moving velocity V based on a period with which zero crossings of the tracking error signal TES occur.

16. The deceleration control system as claimed in claim 8, which further comprises acceleration means for accelerating the track actuator when starting a track jump, said deceleration means decelerating the track actuator when ending the track jump.

17. The deceleration control system as claimed in claim 16, wherein said acceleration means supplies to the track actuator an acceleration pulse having a polarity opposite to that of the deceleration pulse supplied by said deceleration means.

18. A deceleration control system for an optical disk unit which includes an optical head for recording information on and/or reproducing information from tracks of an optical disk by use of a light beam emitted from the optical head, a track actuator for moving the light beam in a direction traversing the tracks of the optical disk, and a tracking error signal generation circuit for deriving a tracking error signal TES from a signal which is output from the optical head and is dependent on a light beam received from the optical disk, said tracking error signal being generated every time the light beam traverses a track, said deceleration control system comprising:

velocity control means coupled to the optical head, said velocity control means including first means for generating a target velocity $V_t$, second means for detecting a beam moving velocity V based on the tracking error signal TES derived by the tracking signal error signal generation circuit, and a third means for detecting a velocity error $V_e$ of the beam moving velocity V with respect to the target velocity $V_t$ and for controlling the track actuator so as to minimize the velocity error $V_e$; and deceleration means for decelerating the track actuator, said deceleration means including first means for deriving a deceleration time T based on the beam moving velocity V at a track which precedes the target track and supplying a deceleration pulse to the track actuator for the deceleration time T starting from a time when the light beam is a predetermined distance from the target track, and second means for calculating a start timing of the deceleration pulse so that the beam moving velocity V becomes zero at a center of the target track, wherein said second means calculates the start timing of the deceleration pulse by calculating a loss time (T)loss from a time when the light beam passes a predetermined track located one track pitch before the target track and a time when the deceleration pulse starts, using a formula $T_p = V \times (T)loss + VT/2$, where $T_p$ denotes a track pitch of the tracks of the optical disk.

19. A deceleration control system for an optical disk unit which includes an optical head for recording information on and/or reproducing information from tracks of an optical disk by use of a light beam emitted from the optical head, a track actuator for moving the light beam in a direction traversing the tracks of the optical disk, and a tracking error signal generation circuit for deriving a tracking error signal TES from a signal which is output from the optical head and ia dependent on a light beam received from the optical disk, said tracking error signal being generated every time the light beam traverses a track, said deceleration control system comprising:

velocity control means coupled to the optical head, said velocity control means including first means for generating a target velocity $V_t$, second means for detecting a beam moving velocity V based on the tracking error signal TES derived by the tracking signal error signal generation circuit, and a third means for detecting a velocity error $V_e$ of the beam moving velocity V with respect to the target velocity $V_t$ and for controlling the track actuator so as to minimize the velocity error $V_e$; and deceleration means for decelerating the track actuator, said deceleration means including first means for deriving a deceleration time T based on the beam moving velocity V at a track which precedes the target track and supplying a deceleration pulse to the track actuator for the deceleration time T starting from a time when the light beam is a predetermined distance form the target track, and second means for calculating a start timing of the deceleration pulse so that the beam moving velocity V becomes zero at a center of the target track, wherein said second means calculates the start timing of the deceleration pulse by calculating a loss time (T)loss from a time when the light beam passes a predetermined track located one-half track pitch before the target track and a time when the deceleration pulse starts.

20. A deceleration control as disclosed in claim 19, wherein said second means calculates the time (T)loss using a formula $T_p/2 = V \times (T)loss + VT/2$, where $T_p$ denotes a track pitch of the tracks of the optical disk.

* * * * *